(No Model.)　　　　　　　　　　　　　　　　　　　5 Sheets—Sheet 1.
W. HOCHHAUSEN.
ELECTRIC ELEVATOR SWITCH.

No. 506,367.　　　　　　　　　　　　Patented Oct. 10, 1893.

Fig. 1.

ATTEST:

INVENTOR:
Wm Hochhausen

By H. L. Townsend
Attorney (No Model.) 5 Sheets—Sheet 2.
W. HOCHHAUSEN.
ELECTRIC ELEVATOR SWITCH.

No. 506,367. Patented Oct. 10, 1893.

ATTEST:
J. A. Hurdle
T. F. Courey

INVENTOR:
Wm Hochhausen

By H. C. Townsend
Attorney (No Model.) 5 Sheets—Sheet 3.

W. HOCHHAUSEN.
ELECTRIC ELEVATOR SWITCH.

No. 506,367. Patented Oct. 10, 1893.

Fig. 3.

ATTEST:
J. A. Hurdle
J. F. Courcy

INVENTOR:
Wm Hochhausen

By H. C. Townsend
Attorney (No Model.) 5 Sheets—Sheet 4.

W. HOCHHAUSEN.
ELECTRIC ELEVATOR SWITCH.

No. 506,367. Patented Oct. 10, 1893.

Fig. 4.

ATTEST:

INVENTOR:
Wm Hochhausen
By H. L. Townsend
Attorney (No Model.) 5 Sheets—Sheet 5.
W. HOCHHAUSEN.
ELECTRIC ELEVATOR SWITCH.

No. 506,367. Patented Oct. 10, 1893.

ATTEST:
J. A. Hurdle
G. F. Courey

INVENTOR:
Wm Hochhausen
By H. G. Townsend
Attorney

UNITED STATES PATENT OFFICE.

WILLIAM HOCHHAUSEN, OF BROOKLYN, NEW YORK.

ELECTRIC-ELEVATOR SWITCH.

SPECIFICATION forming part of Letters Patent No. 506,367, dated October 10, 1893.

Application filed September 9, 1891. Serial No. 405,235. (No model.)

*To all whom it may concern:*

Be it known that I, WILLIAM HOCHHAUSEN, a citizen of the United States, and a resident of Brooklyn, in the county of Kings and State of New York, have invented a certain new and useful Controlling-Switch for Electric Elevators, of which the following is a specification.

My invention relates to the construction of controlling devices for governing the speed and direction of movement of electric motors and the machinery operated by the same, and is designed in some of its features more particularly for application to electric motors combined with hoisting machinery employed, for instance, in hoisting and lowering elevators or lifts.

The object of my invention is to provide a simple and efficient controlling mechanism operating on the electric circuits in the usual or proper way to start, stop or change the direction of movement of the motor, and at the same time avoid the difficulties hitherto experienced from the excessive arcing or sparking at the contacts of the controlling switch.

A further object of my invention is to provide in a simple and effective manner, for the automatic application of a brake to the driven mechanism when the electric switch devices are thrown to position to stop the electric motor.

The switch devices are herein shown and described combined and connected in proper manner for controlling a motor whose armature and field magnet are in different circuits or branches of a circuit, a well known example of which is the shunt wound electric motor, but in many features of mechanical construction my invention is applicable to motors having field and armature circuits combined in other ways.

The novel features of construction and combinations of devices constituting my invention will be first described in connection with the accompanying drawings and then specified in the claims.

In the accompanying drawings.

A, indicates a suitable base plate of insulating material preferably slate which is fixed to any suitable support, and upon which are mounted the various stationary contact plates of the switching devices, while $A^2$, is a suitble movable frame or support which carries the switch blocks or movable connecting contacts or springs of the switching apparatus. The manner of mounting these two plates or supports A, and $A^2$, when the device is employed for controlling a hoist or elevator, will be more particularly described hereinafter.

On the face of the plate A, are mounted suitable contact plates adapted to reverse the direction of the current through the armature of the electric motor and to control the amount of current flowing through the same, the said plates being so arranged and combined with the movable contacts that the controlling mechanism when moved in either direction from a central or dead point for the motor may first close the circuit through the armature with a maximum amount of resistance in the connection and may then gradually cut out said resistance, the direction of movement, however, determining the direction in which the current shall flow. The several plates mounted on plate A, by which this is accomplished, are in my invention divided into three several sets or ranges. One of these sets consists of the two plates B, $B^2$, which form the line contacts of the switch device, they being connected as shown directly with the two supply wires 12, 13, which lead from any suitable source of energy and are respectively of negative and positive polarity. The two plates B, $B^2$, are each arranged to embrace nearly the half circumference of a circle, but are separated by insulating spaces at 14, which are designed to prevent short circuiting of the main line at the point of reversal of the switch. Parallel to the plates B, $B^2$, is another contact plate C, which connects in any suitable way with one terminal of the circuit in which the current is to be reversed, as for instance, to one terminal of the circuit containing the armature or motor indicated in the diagram by the letter H. The plate C, is preferably a continuous plate or if made up of several plates is combined into an electrically continuous plate by connecting them together, and is of sufficient length to embrace the greater part of the circumferential space covered by the two opposite plates B, B².

The third range of plates is indicated by the letters F, F², F³, F⁴, F⁵, F⁶. The plate F, is connected to the terminal of the circuit in which reversals are to be produced opposite to that which connects with the plate C, and the plates F², F³, F⁴, F⁵, connect, as indicated in the diagram, to a rheostat the sections of which may be thrown into or out of circuit as will be presently described to control the amount of current flowing in the armature or similar circuit. The plate F⁶, lies in what I term the neutral or dead zone of the switch and is effective as a contact device only at its ends near the plates F³, F⁴, in connection with suitable supplemental or wear contact devices which will be described farther on. I prefer to make it continuous from one end to the other, as shown, in order that the movable contacts may move over it smoothly.

The movable contacts or connectors are indicated at E, E², and are suitably mounted or supported upon the movable frame or support A². One of the connectors E, is adapted to bridge the space between the exterior range of plates F, to F⁶, inclusive, and the range B, B², while the connector E², is adapted only to complete the electrical connection between the range B, B², and the plate C. The connectors E, E², may be constructed in any proper manner for completing the electrical connection between the several plates or sets of plates, but I prefer to construct them as shown more clearly in the sectional view, each as a solid block attached to two or more guide stems or rods E⁴, which are guided in insulating blocks or pieces E⁵, attached to the movable support or carrier A². Springs E⁶, press the contact blocks or connectors E, E², firmly down upon the fixed contact plates.

The operation of the device in reversing the current in the armature H, and controlling the speed thereof will be obvious. With the connectors in the position shown, it is obvious that current will pass directly from one of the mains or wires 12, to B, E, F, and through the motor to C, from which connection is completed to the other main 13, by E², and B². Assuming, however, that the connector E, rests upon the plate F, at the point opposite the insulating space 14, then on moving the same to the left the connector E², will bridge C, and B², thus completing the connection between one terminal of the motor circuit and the external circuit 13, while the connector E, when it reaches contact F³, will complete the connection between the other pole of the circuit by plate B, and F³, through the whole resistance of the rheostat to F, and the armature. As the switch is turned to the position shown in full lines in the diagram, the sections of resistance will be successively cut out as the connector E, passes from F³, to F², and finally to F, when the current may flow through it to the armature without passing through the resistance. If the connectors be turned in the opposite direction, starting from the point where they rest upon the insulating blocks 14, the current will pass through the armature in the reverse direction inasmuch as the connector E², will now move to bridge or connect B and C, thus putting the terminal of the motor connected to C, into connection with the opposite pole of the circuit. The connector E, as it moves over plates F⁴, and F⁵, to F, will gradually cut out the resistance introduced between the opposite pole of the circuit and the armature;—this connection being formed now by the plate B², and connector E. Similarly in passing from the position shown back to the neutral or dead zone, the resistance will be cut in gradually until finally when the connector E, reaches the plate F⁶, the circuit to the armature will be interrupted.

In order to prevent sparking as the switch moves over the several contacts in making and breaking connection with the motor and with the several sections of the resistance, I combine with the main contacts a series of supplemental or wear contacts and a proper actuating cam or cams or other mechanism moving with the movable switch contact or connector E, whereby the wear contacts may be closed in succession ahead of said connector and opened behind it, thus taking the spark or arc which may form preceding the closure of circuit on a fixed contact plate, or may follow the breakage of contact on said fixed plate. These supplemental wear contacts are indicated at $a$, $a^2$, in pairs, the contacts of each pair being connected respectively with adjoining fixed contact plates. One or both of the contacts $a$, $a^2$, is made movable, but it would be sufficient to make one of them alone movable for which purpose each contact $a^2$, may be mounted upon a movable lever $a^3$, which is mounted upon the plate A, or other fixed support and is preferably provided with a spring $a^4$, tending to force the contact $a^2$, into connection with the contact $a$. These springs may be attached as shown to the sides of the fixed plates.

The several supplemental wear contacts are operated by means of a bar G, the inner edge of which is adapted to engage with rollers upon the levers $a^3$. This bar is mounted so as to move with the connector E, being for that purpose preferably mounted upon the carrier A², and is discontinuous or interrupted at the point opposite the connector E, as shown so that the supplemental switch contacts near said connector may be allowed to close circuit while the said contacts at all other points around the switch will be held open, while, as the connector moves, the ends 17, 18, of said bar will free the supplemental contacts ahead of the connector so as to allow them to close and will open them behind said connector in succession. Thus, in moving from the position shown in the diagram around toward the neutral or dead point, the connector E, will pass on to the plate $F^2$, but will not interrupt connection with F, because of the closure of contact at $a$, $a^2$, until the end 18, of the bar G, shall have engaged with the lever carrying contact $a^2$, and shall thereby open the connection. At this time any spark or arc due to rupture will be produced at the contacts $a$, $a^2$, which are preferably of carbon and are mounted in proper manner to be easily renewable. As the movement continues the supplemental contacts $a$, $a^2$, will close between $F^2$, $F^3$, ahead of the connector E, being freed at 17, so that when the latter passes from $F^2$, to $F^3$, it will not at first interrupt the circuit, but as the movement continues the end 18 of the bar G, will, immediately after E, passes from $F^2$, to $F^3$, break the connection by operating upon the supplemental or wear contact. Finally, when the block E, passes from $F^3$, to $F^6$, it will not at first interrupt connection between the terminal 12, of the circuit and the rheostat and armature, because when it passes over this space, the contacts $a$, $a^2$, will be in connection with one another having been allowed to close by reason of the fact that end 17, of the bar G, has freed the lower lever $a^3$. After, however, the connector E, has passed well along upon the plate $F^6$, the terminal 18, of the cam bar will operate to open the supplemental contacts. As will be seen the same operation will take place as the connector or switch moves in a direction to close the circuit to the armature by passing from $F^6$, to $F^3$, or $F^4$. The end 17 or 18 of the cam bar G, will close the connection between $F^6$, and $F^3$ or $F^4$, by permitting the supplemental or wear contacts $a$, $a^2$, to close and take any spark or arc after which the operating connector E, will pass from $F^6$, to $F^3$ or $F^4$, to make a solid connection. As soon as this has been done the terminal 18 or 17, of the cam bar following will open the supplemental contacts between $F^6$ and $F^3$ or $F^4$, and the connector may then move forward or cut out a section of the resistance, its contact with $F^2$ or $F^5$, as the case may be, being, however, preceded by the closure of the supplemental contact. When the connector reaches the plate F, the supplemental contacts may be left closed, as shown, inasmuch as no further changes in the circuits are required. During the operation upon one side of the switch as at the contacts $F^3$, $F^2$ and F, it will be seen that the supplemental wear contacts upon the other side are all held open in such position as not to interfere with the operation by the cam bar G.

In combination with the devices described for changing the direction of the current in the motor armature, I employ a suitable switch device for making and breaking the circuit through the field magnet of the motor indicated at $H^2$. The terminals of this field magnet may be connected to the main circuit by connection with the plates B, $B^2$, as indicated at 19, 20. Interposed in the field magnet circuit is a current interrupter or circuit opening device which consists of a number of contacts arranged in a series circuit with one another so as to produce a number of breaks in the field magnet circuit thereby producing a large total circuit interrupting space and interrupting any arc which may tend to form under any considerable electro motive force. These switch devices which control the field magnet circuit are timed to close said circuit before the closure of the armature circuit and to open it after the opening of the armature circuit, the purpose being to establish the field magnetism before current is allowed to flow in the armature so that the counter-electromotive force may be developed immediately in the armature when the current begins to flow through it and burning of the armature thereby prevented. The preservation of the field magnet circuit similarly prevents burning on the opening of the armature circuit.

The contacts through which the field magnet circuit is completed in series are indicated at $d$, $d^2$.

I, is a suitable lever pivoted at $I^2$, and carrying the contacts $d$, which are the movable contacts, the contacts $d^2$, being fixed contacts and suitaby mounted upon the base A. All of these contacts are preferably of carbon and mounted so as to be readily renewable. The contacts $d^2$, are mounted in arms or blocks attached to the ends of leaf springs $d^3$, which are fastened upon the lever I, and are designed to allow the contacts to yield independently of one another so as to insure connection between all the bars $d$, $d^2$. The springs $d^3$, which carry the two contacts $d^2$, at one end of the lever as at the right, are preferably insulated from said lever as shown so as to compel a flow of the current in series through all four pairs of contacts. The several contacts being connected, as indicated, by the dotted lines it is not necessary obviously that the two contacts $d$, $d^2$, at one end of the lever should be insulated from one another, the connection being directly from one to the other, and the two thus connected forming together a bridge between two of the fixed contacts $d$, which are insulated from one another upon the base A.

Any actuating mechanism may be employed for operating the lever I, to make and brake the circuit. For convenience I prefer to employ a cam which shall hold said lever in position to close the circuit during the period desired for the proper operation of the motor and control of its speed, and as a cam I may use the outside of the bar G, the ends or terminals of which are suitably beveled, as indicated, to allow them to engage properly with the roller W, carried by the lever I. A spring $I^4$, may be used for opening the circuit of the field magnet when the lever I, is freed by the cam. The outside of the bar G, is of such length that when the connector E, moves from the dead point toward the point where it will close the connection to the armature, the cam G, will engage with the roller W, and close the field magnet circuit before the connector E, or the terminal 17 or 18, of said bar, by freeing the contact $a^2$, carried by $F^3$, or $F^4$, completes the connection to the armature. On reverse movement of the parts as, for instance, from the position shown in the drawings, the terminal 18, of the cam bar will open the final supplemental contacts connecting $F^3$ and $F^6$, before the outside of the cam bar G, at the end 17, frees the switch lever I, so as to open the field magnet circuit. The same operation would obviously take place in reversing the movement of the switch from the position where current is allowed to flow freely in opposite direction through the armature. In this case the terminal 18, of the cam bar would not free the switch I, until after the terminal 17, had freed the terminal wear contact $a^2$, connected to $F^4$, and therefore the armature should continue to generate counter electro-motive force until the instant that it is thrown out of circuit.

In combination with the mechanism operated by the motor, I employ a suitable brake and brake mechanism the function of which latter is to cause the brake to be applied as soon as the motor is thrown out of operation. This brake magnet may for convenience be connected to the circuit of the field magnet, so that when the current is cut off from the latter the current will be cut off from the brake magnet. In this case the brake magnet is so combined with the brake mechanism as to throw off the brake or lift the brake shoe when it is excited but to apply the brake as, for instance, by letting the brake shoe fall and impinge upon the brake wheel by the action of a spring or other device, when the current ceases to flow through the brake magnet. Such a mechanism will be presently described. The said brake magnet is indicated at $H^3$, in the diagram. While I have shown it as connected to the circuit controlled by the main switch device that operates upon the field magnet circuit, it is obvious that it might be controlled in its action in a similar way by a proper switch timed to effect its circuit as soon as the motor is thrown out of operation. By this means the driven mechanism will be automatically prevented from going past the proper stopping point by momentum after the switch has been thrown to the position for stopping the movement. When the brake magnet is combined with the circuits as shown, it is obvious that it will be automatically cut out of circuit before the motor is started, inasmuch as the switch which controls the field magnet circuit closes before the connector or switch device completes the armature circuit.

Figure 1:
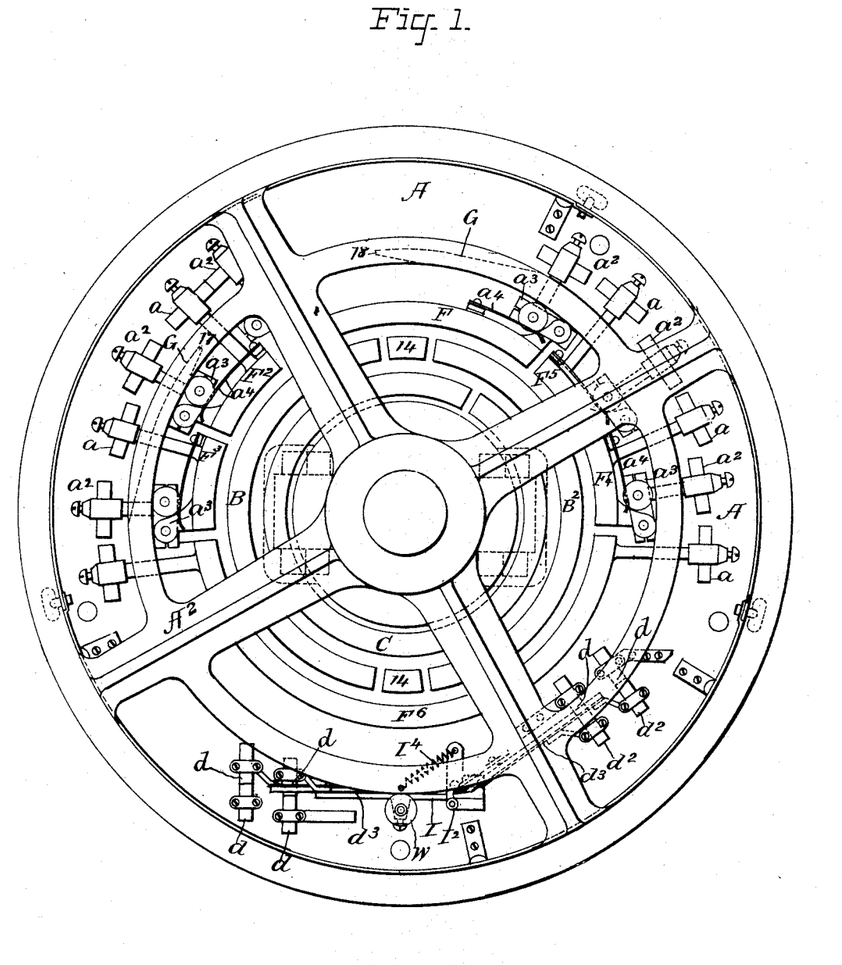
—Figure 1, is a plan of an electric controlling switch constructed in accordance with my invention.
Figure 2:
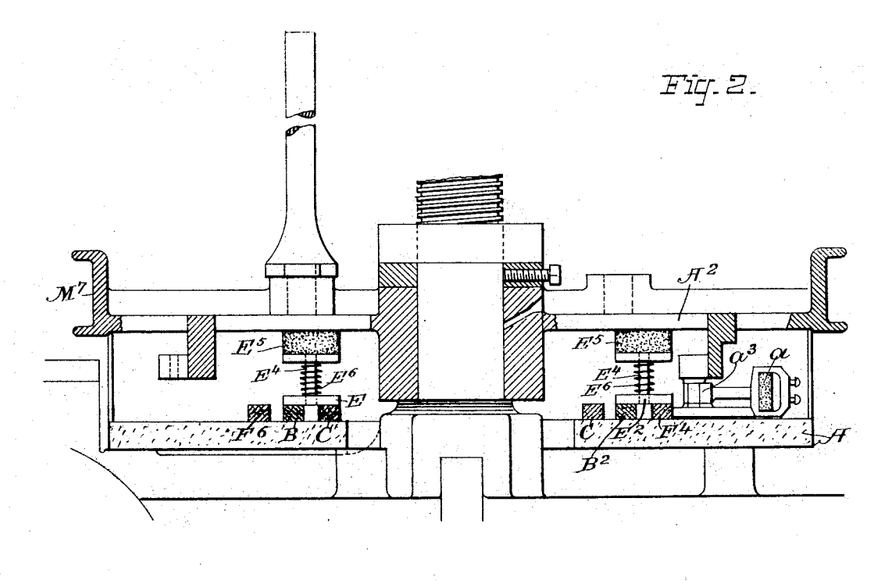
Fig. 2, is a cross section through the same.
Figure 3:
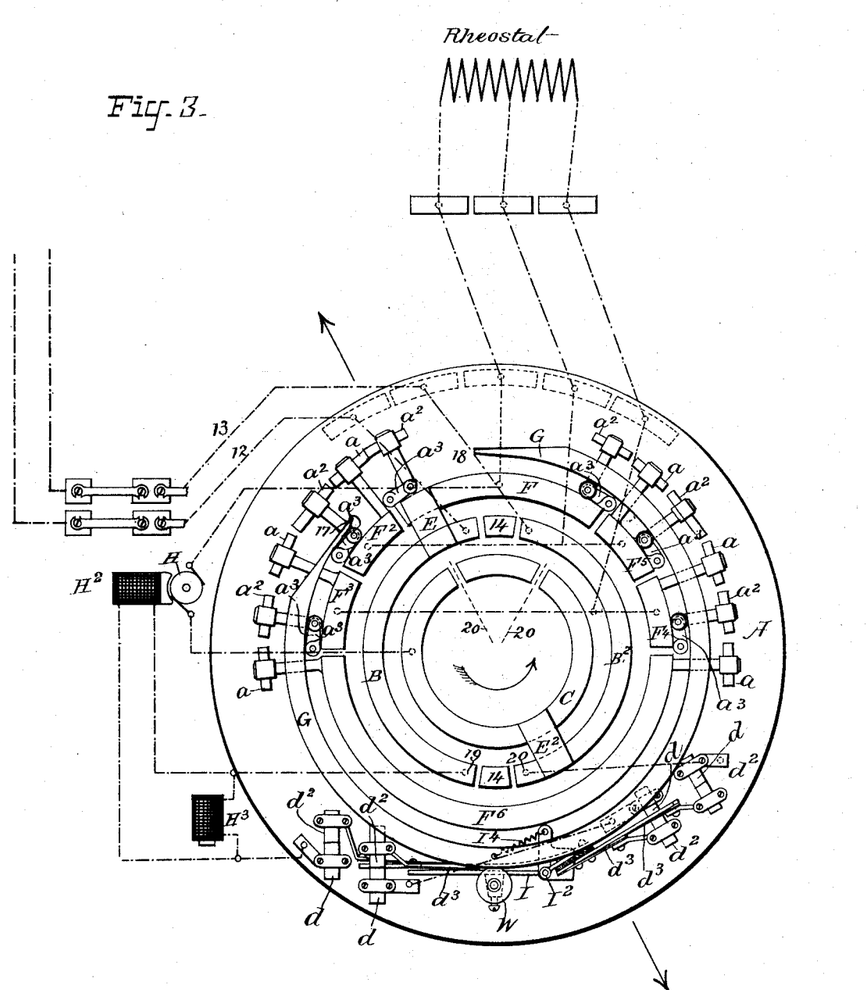
Fig. 3, is a diagram illustrating the connections of the switch with a motor, a rheostat and a brake magnet.
Figure 4:
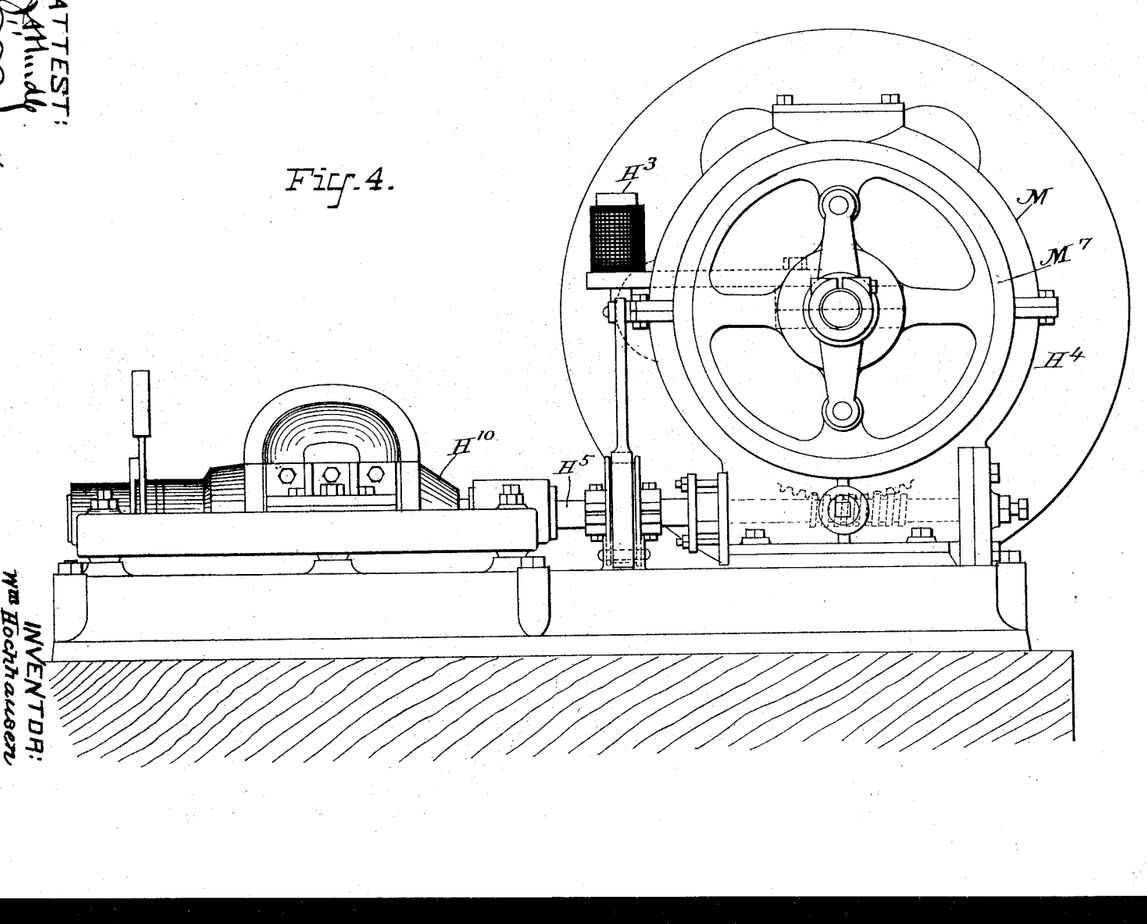
Fig. 4, shows in side elevation the hoisting mechanism to which the motor and brake mechanism are applied.
Figure 5:
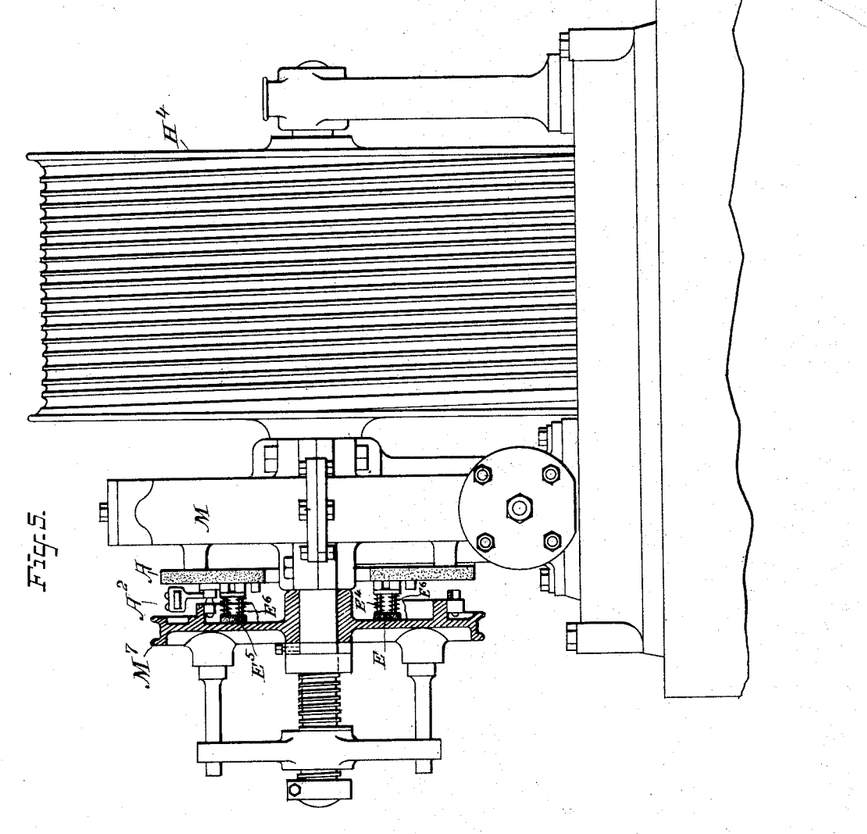
Fig. 5, is an end elevation of such mechanism the parts which support the switch being shown in vertical section.
Figure 6:
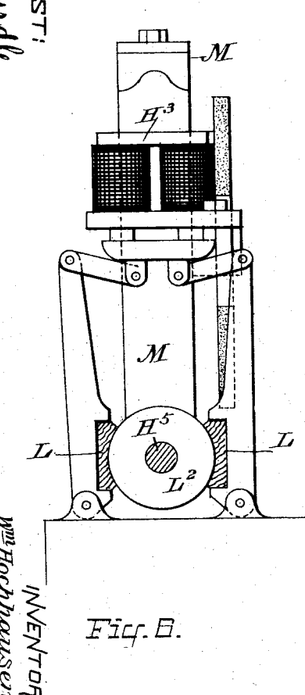
Fig. 6, shows the brake mechanism in detail.

Referring now to Figs. 3, 4, 5 and 6, the manner of mounting the mechanism for controlling an electric motor used in connection with a hoisting and lowering apparatus, will be more fully understood. $H^{10}$, represents the armature and $H^5$, the armature shaft which communicates movement to the hoisting drum $H^4$, by means of a worm and gear indicated in dotted lines. M, is the casing for the worm wheel. To the side of this casing is attached by suitable posts the slate base A. The movable support $A^2$, for the switching devices is formed by the usual hand rope wheel $M^7$, which is loosely mounted upon the drum wheel shaft in the ordinary manner. The wheel $M^7$, is adapted to be turned as well understood, by means of the rope which passes through the elevator car suspended from the rope wound upon the drum $H^4$. By operating the hand rope and turning the wheel in the ordinary way, that is now employed with hydraulic and similar elevators, the switch mechanism described may be turned to cause the hoisting and lowering of the elevator car as will be readily understood from the foregoing description of the action of the switch or controlling mechanism. By thus mounting the two parts of the switch upon plates or supports parallel to one another, one constituting the ordinary hand rope wheel and the other upon the worm casing parallel thereto, it will be seen that an exceedingly compact and simple switch mechanism is provided. It will of course be understood that the usual stops are employed for limiting the movement of the controlling mechanism for the elevator, such stops being adjusted or arranged to permit a nearly whole revolution of the switch contact E, as, for instance, from the position shown around to a position of coincidence with the right hand one of the radial dotted lines 20, (Fig. 3) in which movement the following cycle of actions will take place:—First the resistance would be gradually introduced into the circuit of the armature decreasing the speed of the motor in the direction say which raises the car and finally the connection with the armature would be broken after the contact E, has passed on to the plate $F^6$. On further movement, the switch having multiple contacts in series would be allowed to open and break the circuit of the field magnet. At the same time the brake would be applied to bring the car to rest. The continued movement of the switch contact E, of the controlling mechanism would not produce any effect upon the circuits or apparatus and such condition would be permitted to exist through a considerable range of movement. On further movement the contacts E and $E^2$, would come into relation to the contact plates to reverse the connections in the armature when they had moved sufficiently to complete the armature circuit, but before such completion of armature circuit took place, the field magnet circuit would be closed and the brake taken off through the closure of switch I. Following this the circuit of the armature would be closed but in a direction to reverse its movement so that the motor would now begin to turn in a direction to lower the elevator. On the continuance of the movement the resistance would be gradually cut out until the contact E, would finally reach the plate F, and the motor would then run at full speed. The brake magnet $H^3$, is conveniently mounted upon the bracket attached to the worm wheel case. The brake shoes L, work upon a brake wheel $L^2$, which is carried by the armature shaft $H^5$. The shoes are operated through a toggle joint connection, as clearly indicated, with the movable cores or armatures of the electro-magnets $H^3$. When the cores of the magnets are drawn up the toggle is operated in a way to throw off the brake shoes, while on the lowering of the cores, the brake shoes are applied by the weight of the cores or by the action of a spring or other power.

As will be observed, the brake mechanism, the switch or controller and the motor are combined in a very effective and simple manner, but I do not wish to be understood as limiting myself to the particular construction of brake mechanism magnetically controlled, since other constructions of electric brake might be used to operate in combination with the switch or controlling mechanism governing the circuits of the brake magnet in substantially the same manner as already described. It will also be apparent to electricians that the electric controlling mechanism will operate in the same manner if placed in any other position as, for instance, upon the elevator car itself, but I prefer to mount it in the particular way shown.

I do not limit myself to any particular construction of mechanical devices for acting upon the supplemental contacts and upon the switch that controls the circuit of the field magnet for the motor and have only shown a cam device as typical of any mechanism for the purpose. I, however, prefer to employ a cam combined as shown with the other devices because of the simplicity and compactness which may be secured in the controlling mechanism.

It will also be understood that while I have shown a single cam bar for acting upon both the supplemental or wear contacts and the field magnet switch, separate cam bars might be employed.

The rheostat combined with the contact plates upon which the movable part of the switch successively closes circuit, forms, in connection with the armature circuit, a means for controlling the speed of the motor, but I do not limit myself to the employment of a resistance as there are other ways known in the art of controlling the speed of the motor for closing in succession a series of contacts having electrical connections whereby the power of the motor may be varied. While, therefore, the contacts F, $F^2$, $F^3$, $F^4$, $F^5$, &c., form, when used in connection with the rheostat, what may be termed a series of speed controlling blocks or contact plates, I do not limit myself to the employment of them in connection with a resistance or rheostat.

What I claim as my invention is—

1. The combination in a reversing and speed controlling electric switch for an electric motor, of the three parallel contact plates or sets of plates one comprising two line contact plates, another two sets of speed controlling plates, and the third a continuous plate or block connected to the terminal of the circuit in which reversals are to be produced, and two bridging or connecting contacts one adapted to move in connection with the line plates and the speed controlling plates, and the other in connection with the line plates and the plate connected to the circuit wherein the current is to be reversed.

2. In a controlling switch for electric motors, the combination substantially as described, of two curved line contact plates B, $B^2$, each extending over substantially a half circumference of a circle, two sets of speed controlling plates arranged in a line concentric with the former, a third circular contact plate connected to the armature circuit, and two connectors E, $E^2$, adapted to connect said plates in the manner described.

3. The combination substantially as described, in a controlling switch for an electric motor, of the two semicircular contact plates B, $B^2$, the exterior plates F, $F^2$, $F^3$, $F^4$, $F^5$, connected to the rheostat, the plate C, parallel to the plates B, $B^2$, and the two connector blocks E, $E^2$, bridging the spaces between said plates, as and for the purpose described.

4. The combination substantially as described, in a reversing and speed controlling switch for an electric motor, of the plates B, $B^2$, forming parts of an interrupted circle interrupted at two points 14, a plate C, parallel to the plates B, $B^2$, a plate F, having on either side the speed controlling plates $F^2$, $F^3$, $F^4$, $F^5$, arranged in the same circle with it, the intermediate plate $F^6$, and the two contact blocks E, $E^2$, combined and arranged as and for the purpose described.

5. The combination substantially as described, with an electric motor, of two fixed line plates connected respectively to opposite terminals of the supply circuit and arranged in the same circumferential line, a continuous plate parallel to the same and connected to one terminal of the motor armature, a connector bridging the space between the said line plates and the armature plate, two sets of contact plates connected to a resistance and arranged parallel to the said line terminal contact plates, and a connector block bridging the space between said line terminals and the resistance contacts and adapted to move on to a line terminal of one polarity when the first named connector block moves upon the opposite terminal.

6. The combination with a switch contact and a set of fixed contacts over which it is adapted to move, of a set of supplemental or wear contacts, and actuating mechanism for the latter which throws them into engagement prior to engagement of the main contact and which throws them out of engagement subsequent to the disengagement of the main contact.

7. The combination with an electric switch having a series of contacts adapted to be closed in succession, of a set of supplemental or wear contacts, and an actuating mechanism for the latter arranged to engage with and operate the same before the closing and after the opening of the main contacts in succession in either direction.

8. The combination in an electric switch, of a series of contact plates, a switch contact adapted to move over the same and to bear successively upon them, a corresponding series of supplemental or wear contacts adapted to bridge or connect the successive fixed contacts, and actuating devices arranged at opposite sides of the movable contact so as to operate upon the supplemental contacts both before and behind the movable contact.

9. The combination, substantially as described, with the two sets of contacts $F$, $F^2$, $F^3$, $F^6$, and $F$, $F^5$, $F^4$, $F^6$, of a movable contact, two corresponding sets of supplemental wear contacts, and an actuating cam G, moving with a movable contact, as and for the purpose described.

10. The combination with an electric motor, of a current reversing and speed controlling switch, having two sets of speed controlling contacts and supplemental or wear contacts connected with the latter, and an actuating cam mechanically connected with the movable contact of the switch for operating on said wear contacts in the manner described so as to cause the same to open behind and close ahead of the said movable contact, as and for the purpose described.

11. The combination substantially as described, with the two sets of speed controlling contacts and their supplemental or wear contacts, of a movable switch contact, and a cam connected with the latter and adapted to hold the wear contacts open on one side of the switch during the operation of the contacts behind and ahead of the movable contact on the other side.

12. The combination with the two sets of speed controlling contacts $F$, $F^2$, $F^3$ and $F$, $F^5$, $F^4$, of the intermediate plate $F^6$, terminating at its opposite ends in the supplemental wear contacts, as and for the purpose described.

13. The combination substantially as described, in an electric motor controlling switch, of a plate F, connected to one terminal of the armature circuit and to one terminal of a rheostat, contact plates arranged in the circumference of a circle at either side of the plate F, and connected to an intermediate point or points of the rheostat and to the opposite terminal thereof in regular order, a semi-circular plate $F^6$, between the terminal contact plates of the two sets, two semi-circular plates B, $B^2$, insulated from one another at points opposite the plate F, and the semi-circular plate $F^6$, and a connector E, adapted to move from the plate $F^6$, to the plate F, in either direction over either set of contacts connected to the resistance.

14. The combination in an electric motor switch, of plates F, $F^2$, $F^3$, $F^4$, $F^5$, $F^6$, arranged in a circle, the two semi-circular plates B, $B^2$, the plate C, concentric therewith the contacts E, $E^2$, adapted to bridge or connect the plates in the manner described, and connections from said fixed plates to a source of energy and to the circuit in which the current is to be reversed and varied, as and for the purpose described.

15. The combination substantially as described, of the two sets of fixed plates, a contact adapted to be moved from an intermediate position between the sets over the contacts of each set in succession, supplemental or wear contacts connected with each set, and a cam moving with the movable contact and adapted to hold the supplemental wear contacts of one set out of action while the supplemental wear contacts of the other set are in operation in connection with the movable contact.

16. The combination substantially as described, in an electric switch, of a semi-circular plate $F^6$, terminating in wear contacts, contacts $F^4$, $F^5$, $F^3$, $F^2$, at opposite ends of the contact plate $F^6$, a contact block movable over said plate, the supplemental or wear contacts, and an actuating cam for operating upon the same, as and for the purpose described.

17. The combination in a circuit in which current is to be reversed and controlled in amount, of switch plates F, $F^2$, $F^3$, $F^4$, $F^5$, $F^6$, connected to the said circuit and to a rheostat, supplemental or wear contacts adapted to bridge or connect said plates, the plate C, connected to an opposite terminal of the circuit, the two line contact plates B, $B^2$, two movable contact blocks E, $E^2$, and a connected cam bar G, all combined and operating in the manner and for the purpose set forth.

18. The combination substantially as described, of two or more pairs of circuit making and breaking contacts connected in series in an electric circuit, a movable lever or support having secured thereto each independently of the other one of each pair of contacts, and means for actuating said lever or support whereby two or more breaks may be produced in the circuit at once.

19. The combination in an electric switch, of two or more pairs of contacts, connected in electrical-series, and a movable support upon which one contact of each pair is yieldingly mounted independently of the other.

20. The combination in an electric switch, of the four pairs of contacts $d$, $d^2$, connected in series, and a movable lever or support to which the four movable contacts, are secured each independently of the other two of which are electrically connected together but insulated from the two others.

21. The combination with the current reversing and resistance controlling switch mechanism connected with the armature circuit for a motor, of a field circuit switch comprising a number of pairs of contacts connected in series, and mechanism operatively connected with the armature circuit switch for actuating said field switch, as and for the purpose described.

22. The combination substantially as described, with an electric motor, of a movable switching device, adapted to reverse the current in the motor armature and vary the resistance in the circuit thereof, a field magnet switch consisting of a number of pairs of electric contacts connected in series in the field magnet circuit, and an actuating mechanism therefor timed to close the field magnet circuit before the closure of the armature circuit.

23. The combination substantially as described, with a movable switching device adapted to reverse the current in the electric motor armature and control the amount of current therein flowing, of a field magnet switch consisting of a number of pairs of contacts connected in electric series, a lever supporting the movable contacts of the pairs, and an actuating cam for said lever mounted to move with the switching device that controls the armature circuit and formed as described to close the field magnet switch on movement of the armature switching devices in either direction from a position of rest.

24. The combination substantially as described, with a set of fixed switch contacts, of a movable switching device movable over the same, a series of supplemental wear contacts connected with the fixed contacts, a second switch, and a cam bar connected with the movable switching device and which upon one side acts upon the latter switch and upon the other operates the supplemental or wear contacts.

25. The combination with a shunt wound electric motor, of a movable switching device adapted to open and close the armature circuit, and a field magnet switch comprising a number of pairs of contacts connected in electric series and having an actuating mechanism depending for operation upon the action of the switch controlling the armature circuit.

26. The combination, substantially as described, of an electric motor, an electric switch controlling the circuit of the armature of the motor, operating mechanism therefor, a supplemental part controlling the contacts of said switch, a brake magnet, and an independent switch for the circuit thereof controlled by said supplemental part.

27. The combination substantially as described, with an electric motor having an armature and field magnet in different circuits, of a movable switching device adapted to control the motor armature circuit and the field magnet circuit in the order described, and a brake magnet controlling the brake mechanism which operates upon the driven mechanism and itself connected with the field magnet circuit.

28. The combination substantially as described, with a hoisting device and a driving electric motor, of a movable switching device adapted to determine the direction in which the current shall flow in the armature circuit according to the direction in which the said device is turned, a rheostat and contacts whereby a resistance in the motor circuit may be gradually thrown out as the said device continues its movement in a given direction, switch devices connected with the field magnet circuit and operatively connected with the armature switch in the manner described so as to throw the field into circuit before the armature circuit is closed, and a brake magnet connected with the field magnet circuit, as and for the purpose described.

29. The combination substantially as described, with the hand rope wheel carrying two bridging or connecting contacts, of current reversing and speed controlling contacts mounted upon a suitable fixed plate opposite the same, as and for the purpose described.

30. The combination substantially as described, of the hand rope wheel carrying the movable switch contacts E, $E^2$, a set of fixed contacts mounted upon a plate opposite the same and having a series of supplemental or wear contacts, and an actuating cam or bar for the latter attached to the hand rope wheel.

31. The combination substantially as described, in an electric elevator, of the hand rope wheel carrying the movable contacts of the switching devices, a set of current reversing and speed controlling contacts mounted on a fixed plate opposite the hand rope wheel and connected to the armature circuit of the motor, a switch connected to the field magnet circuit of the motor and mounted upon a suitable fixed support, and an actuating cam for the latter switch carried by the hand rope wheel.

32. The combination with an electric elevator, of an electric motor driving the same through a worm gear, as described, and a controlling switch for said motor having its fixed contacts or parts mounted upon an insulating plate secured to the worm wheel casing and having its movable portions mounted upon the face of the hand rope wheel opposite the same.

33. The combination substantially as described, of an electric motor, a driving mechanism connected therewith through a worm gear, a brake magnet controlling a brake applied to a driven shaft of the apparatus, and electric switch devices the fixed portion of which is mounted upon the worm wheel casing while the movable portion thereof is mounted upon a hand rope wheel opposite the same.

34. The combination substantially as described, with an electric elevator, of a motor adapted to lower and hoist the same, a movable switch device controlled from the elevator car and having contacts and connections to the armature and a rheostat, whereby it may reverse the connections of the armature circuit and control the flow of current therein, a field magnet circuit in a separate branch having connections with switching mechanism operatively connected with the actuating mechanism of the armature switch and timed to close the field magnet circuit before the armature circuit is completed, a brake magnet connected with the field magnet circuit, and a brake acting on a brake wheel attached to a driven shaft of the apparatus, as and for the purpose described.

Signed at New York, in the county of New York and State of New York, this 31st day of August, A. D. 1891.

WILLIAM HOCHHAUSEN.

Witnesses:
   WM. H. CAPEL,
   T. F. COUREY.